(12) United States Patent
Fainstein et al.

(10) Patent No.: US 6,202,002 B1
(45) Date of Patent: Mar. 13, 2001

(54) AUTOMATIC MONITORING OF TOOL STATUS

(75) Inventors: Boris Fainstein; Eduard Tabachnik, both of Jerusalem; Mark Zuckerman, Tel-Aviv; Igor Rubashkin, Jerusalem, all of (IL)

(73) Assignee: Omat Ltd., Jerusalem (IL)

( * ) Notice: Subject to any disclaimer, the term of this patent is extended or adjusted under 35 U.S.C. 154(b) by 0 days.

(21) Appl. No.: 09/101,237

(22) PCT Filed: Jan. 2, 1997

(86) PCT No.: PCT/IL97/00003

§ 371 Date: Sep. 2, 1998

§ 102(e) Date: Sep. 2, 1998

(87) PCT Pub. No.: WO97/25659

PCT Pub. Date: Jul. 17, 1997

(30) Foreign Application Priority Data

Jan. 3, 1996 (IL) .......................................... 116667

(51) Int. Cl.[7] .................................................. G06F 19/00
(52) U.S. Cl. ........................ 700/175; 702/44; 318/568.1; 700/52
(58) Field of Search ............................... 700/44, 52, 173, 700/174, 175, 275; 702/44; 318/568.1

(56) References Cited

U.S. PATENT DOCUMENTS

| 4,208,718 | 6/1980 | Chung | 700/173 |
| 4,547,847 | 10/1985 | Olig et al. | 700/52 |
| 4,802,095 | 1/1989 | Jeppsson | 700/175 |
| 6,107,768 * | 8/2000 | Ouchi et al. | 318/568.1 |

FOREIGN PATENT DOCUMENTS 9414569    7/1994    (WO) .

* cited by examiner

Primary Examiner—Paul P. Gordon
Assistant Examiner—Sheela S. Rao
(74) Attorney, Agent, or Firm—Browdy And Neimark

(57) ABSTRACT

Automatic monitoring system and method for providing an instantaneous tool status indication for a stock removal cutter when cutting workpieces in accordance with a given machining operation for which a substantially new stock removal cutter of the same type has a reference average tool wear coefficient $R_0$. The system includes a torque monitor (7) for measuring a main drive cutting torque M during the cutting of an ith successive workpiece. Coupled to the torque monitor (7), is an instantaneous tool wear coefficient processor (13) for calculating a plurality of instantaneous tool wear coefficients $r_{(j)}$ during the cutting of the ith successive workpiece. Coupled to the instantaneous tool wear coefficient processor (13) is an average tool wear coefficient processor (14) for calculating an average tool wear coefficient $R_{(i)}$ from the plurality of instantaneous tool wear coefficient $r_{(j)}$ And finally, coupled to the average tool wear coefficient processor (14) is a tool wear coefficient comparator (15) for comparing each average tool wear coefficient $R_{(i)}$ to the reference average tool wear coefficient $R_0$ to provide an instantaneous tool status indication for the stock removal cutter for each ith successive workpiece.

4 Claims, 4 Drawing Sheets

AUTOMATIC MONITORING OF TOOL STATUS

FIELD OF THE INVENTION

The invention is generally in the field of automatic monitoring of tool status during a stock removing operation. In particular, the invention relates to the automatic monitoring of the tool status of a stock removal cutter as a function of the torque developed by a machine tool during a machining operation.

BACKGROUND OF THE INVENTION

A CNC program instructs a milling cutter rotatably driven by a machine tool to cut a workpiece along a cutting path. Without adaptive control of at least the milling cutter's feed rate relative to a workpiece, the machine tool is required to develop an ever increasing torque for the milling cutter to cut successive workpieces in accordance with the CNC program due to its progressively worsening tool wear.

Automatic torque responsive monitoring of the tool status of milling cutters is known in the art, for example, U.S. Pat. No. 4,208,718 to Chung and U.S. Pat. No. 4,802,095 to Jeppesson.

U.S. Pat. No. 4,208,718 to Chung describes an automatic monitoring method in which a tool status indication of a milling cutter is determined as a function of the length of cutting time under increased target horsepower as a percentage of the total cutting time for a machining operation.

U.S. Pat. No. 4,802,095 to Jeppesson describes an automatic monitoring method in which a resultant side loading force FRES, having tangential FT and radial FR components. during a milling operation is measured directly along with its FT component and, on the basis of which, its FR component is determined mathematically for providing an indication of tool wear.

In U.S. Pat. No. 4,547,847 there is described an adaptive control for machine tools which provides tool monitoring functions under a subroutine TLfiNTR illustrated in FIG. 13H and described in col. 35, line 64 to col. 38, line 49. The subroutine TLMNTR assumes a basically linear dulling process and requires several cutting parameters from the operating NC program, such as feed rate and spindle speed. In addition, the subroutine requires either a known or constant depth of cut which, in the case of the former, is compensated for in a linear fashion. As such, the subroutine is suitable for predicting tool life in relatively straightforward turning applications.

SUMMARY OF THE INVENTION

A primary object of the invention is to provide for automatic monitoring of the tool status of a stock removal cutter, and in particular a milling cutter, during a machining operation under the control of an adaptive control system adapted to maintain a substantially uniform torque as developed by a machine tool during the machining operation.

In accordance with a first aspect of the present invention, there is provided a system for automatically monitoring tool status so as to provide an instantaneous tool status indication for a stock removal cutter cutting identical workpieces in accordance with a given machining operation for which a substantially new stock removal cutter of the same type has a reference average tool wear coefficient $R_0$, the system comprising:

(a) means for determining a main drive cutting torque M during the cutting of an ith successive workpiece;

(b) an instantaneous tool wear coefficient processor for calculating a plurality of instantaneous tool wear coefficients r1(j)for the stock removal cutter during the cutting of said ith workpiece;

(c) an average tool wear coefficient processor for calculating an average tool coefficient $R_{(i)}$ for the stock removal cutter from said plurality of instantaneous tool wear coefficients $r_{(j)}$; and (d) a tool wear coefficient comparator for comparing said average toot wear coefficient $R_{(i)}$ to the reference average tool wear coefficient $R_0$ to provide an instantaneous tool status indication for the stock removal cutter after cutting each ith successive workpiece; characterized in that said instantaneous tool wear coefficient processor calculates an instantaneous tool wear coefficient $r_{(j)}$ in accordance with the general relationship: $M_{(j)} = A_0 F_{(j)}^{\alpha} r_{(j)}^{\beta}$ wherein F is the instantaneous feed rate of the relative movement between the stock removal cutter and a workpiece and $A_0$, $\alpha$ and $\beta$ are coefficients dependent on the stock removal cutter cum workpiece material combination.

In Applicant's WO94/14569, there is described an adaptive control system for adaptively controlling at least a milling cutter's feed rate in response to the torque developed by a machine tool rotatably driving the milling cutter in accordance with the general relationship: $M = AF^{\gamma} p^{\gamma}$ where M is the measured torque developed by a machine tool rotatably driving a milling cutter, F is the instantaneous feed rate of a milling cutter, p is the cross-sectional area of a workpiece instantaneously worked on by a milling cutter and A, y and γ are coefficients dependent on a milling cutter and a workpiece material.

It has now been found that the tool status of a stock removal cutter for a given machining operation defining all factors pertinent thereto including, inter alia, a machine tool, a workpiece including its material, a cutting path, a feed rate, a spindle speed and the use of a particular type of coolant can be deduced from the same type of general relationship: $M = A_0 F^{60} R^{\beta}$.

In this relationship, M is the measured torque developed by a machine tool, F is the instantaneous feed rate of the relative movement between a stock removal cutter and-a workpiece and $A_0$, $\alpha$ and $\beta$ are coefficients dependent on a particular stock removal cutter cum workpiece 20 material combination. In addition, a coefficient triplet ($A_0$, $\alpha$, $\beta$) is determined such that the ratio $R_{(i)}/R_0$ where $R_{(i)}$ is the coefficient indicative of the tool wear of a stock removal cutter after cutting an ith successive workpiece and $R_0$ is a reference average tool wear coefficient for a substantially new stock removal cutter executing the same machining 25 operation equals a predetermined upper critical threshold $\epsilon_u$ corresponding to when the stock removal cutter is substantially dulled.

A stock removal cutter is replaced when tne ratio $R_{(i)}/R_0$ either exceeds the upper critical threshold $\epsilon_u$ or suddenly drops below a lower critical threshold $\epsilon_l$ indicative of a broken stock removal cutter. For the sake 30 of convenience, both the upper and lower critical thresholds $\epsilon_u$ and $\epsilon_l$ are machining operation invariant and respectively equal 1.6 and 0.9. The lower critical threshold $\epsilon_l$ preferably equals 0.9 rather than 1, thereby indicating that a stock removal cutter is truly broken rather than the ratio $R_{(i)}/R_0$ dropping below 1 for some other reason, i.e. breakage of a workpiece.

Against this, when the ratio $R_{(i)}/R_0$ falls within the operative range [0.9,1.6], the tool wear of a stock removal cutter is preferably indicated to a machine operator as a tool wear percentage where 100% indicates that a stock removal cutter is new and 0% indicates that it is worn and should be replaced. Based on the nominal upper critical threshold $\epsilon_u=1.6$, the tool wear percentage is calculated from the following relationship:

$$\left[\frac{1.6 - R_{(i)}/R_0}{0.6}\right] \times 100\%$$

The machine tool is dependent on the stock removal operation and, consequently, in a milling operation, the torque M is the torque developed by a machine tool rotatably driving a milling cutter whilst, in a turning operation, the torque M is the torque developed by a machine tool rotatably driving a workpiece. In the case of providing the instantaneous tool status indication of a milling cutter, it has now been found that a more accurate indication is obtained when the relationship $M=A_0F^\alpha R^\beta$ is adapted to: $M=A_0F_z^\alpha R^\beta$ where $F_z$ is the feed per tooth of a milling cutter to take into consideration that a milling cutter is a multi-edge cutting tool.

In accordance with a second aspect of the present invention, there is provided a method for automatically monitoring tool status so as to provide an instantaneous tool status indication for a stock removal cutter cutting identical workpieces in accordance with a given machining operation for which a substantially new stock removal cutter of the same type has a reference average tool wear coefficient $R_0$, the method comprising the steps of:

(a) measuring a main drive cutting torque M during the cutting of an ith successive workpiece;

(b) calculating a plurality of instantaneous tool wear coefficients $r_{(j)}$ for the stock removal cutter during the cutting of the ith successive workpiece:

(c) calculating an average tool wear coefficient $R_{(i)}$ for the stock removal cutter from said plurality of instantaneous tool wear coefficients $r_{(j)}$; and (d) comparing said average tool wear coefficient $R_{(i)}$ to the reference average tool wear coefficient $R_0$ to provide an instantaneous tool status indication for the stock removal cutter after cutting each ith successive workpiece;

characterized in that step (b) includes calculating an instantaneous tool wear coefficient $r_{(j)}$ in accordance with the general relationship: $M_{(j)}=A_0F_{(j)}^\alpha r_{(j)}^\beta$ wherein F is the instantaneous feed rate of the relative movement between the stock removal cutter and a workpiece and $A_0$, $\alpha$ and $\beta$ are coefficients dependent on the stock removal cutter cum workpiece material combination.

BRIEF DESCRIPTION OF THE DRAWINGS

For a better understanding of the present invention and to show how the same can be carried out in practice, reference will now be made, by way of non-limiting example only, to the accompanying drawings in which.

DETAILED DESCRIPTION OF A PREFERRED EMBODIMENT

Figure 1:
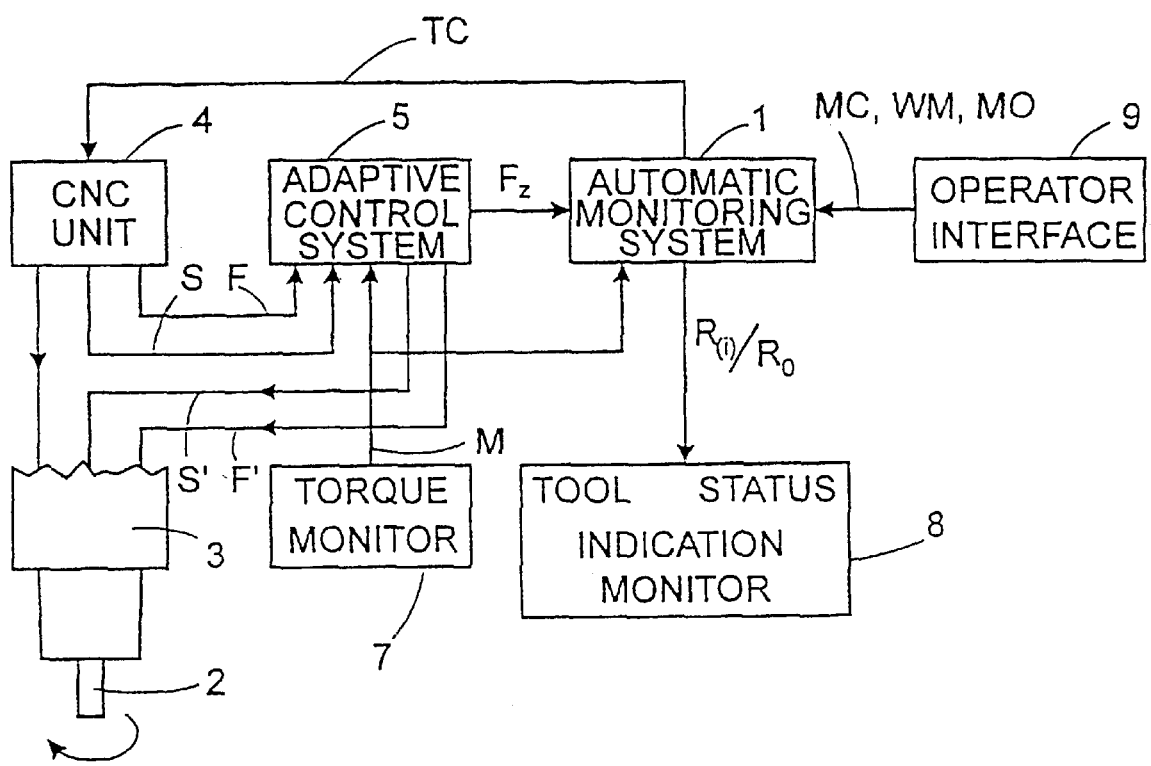
FIG. 1 is a schematic view of an automatic monitoring system (AMS) for providing an instantaneous tool status indication for a milling cutter.

FIG. 1 shows an automatic monitoring system (AMS) 1 for providing an instantaneous tool status indication for a milling cutter 2 rotatably driven by a machine tool 3 under the control of a CNC unit 4 as modified by an adaptive control system (ACS) 5 for adaptively controlling at least the milling cutter's feed rate in response to the torque developed by the machine tool 3 as measured by a torque monitor 7 connected thereto. Such an ACS 5 is, for example, described in Applicant's WO94/14569 which can also adaptively control a milling cutter's spindle speed S.

The instantaneous tool status indication can be displayed as a tool wear percentage on a tool status indication monitor 8 for appropriate use by a machine operator i.e. the change of a worn milling cutter. Alternatively, tool status can be indicated on the monitor 8 as a readout "operative" or, alternatively, "inoperative" when either the milling cutter 2 is worn or broken. In addition, when the milling cutter 2 is worn or broken, the AMS 1 can issue a tool change interruption signal (TC) to the CNC unit 4.

Also coupled to the AMS 1 is an operator interface 9 via which an operator inputs a milling cutter (MC) code indicating a milling cutter type, a workpiece material (WM) code indicating a workpiece material and a machining operation (MO) code indicating a machining operation.

Figure 2:
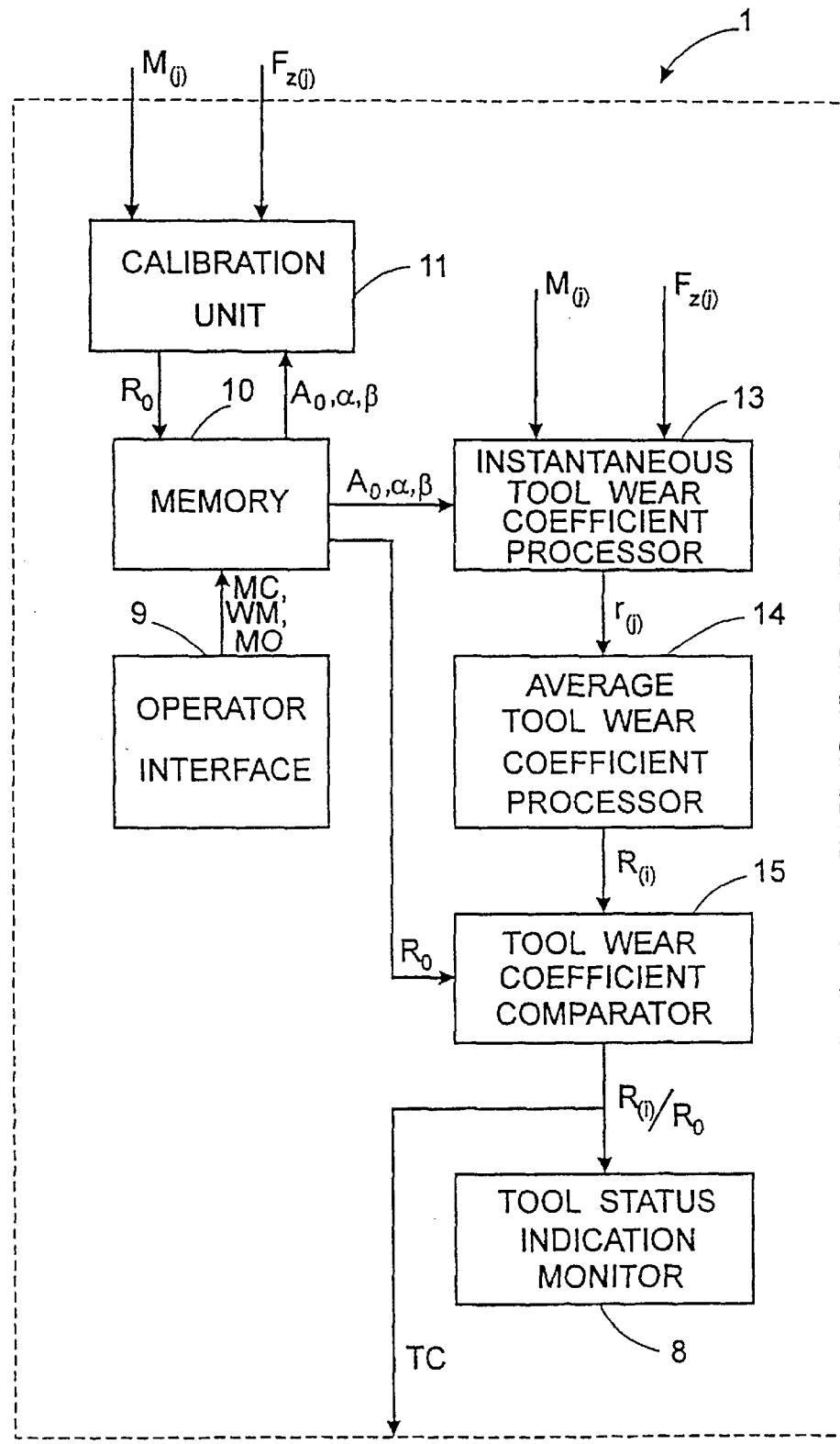
FIG. 2 is a schematic block diagram of the AMS of FIG. 1.

FIG. 2 shows that the AMS 1 includes a memory 10 storing coefficient triplets ($A_0$, $\alpha$, $\beta$) for different milling cutter cum workpiece material combinations and the reference average tool wear coefficients Ro for different machining operations.

Typical coefficient triplets ($A_0$, $\alpha$, $\beta$) for a solid end milling cutter having four flutes are as follows: ($A_0=148$, $\alpha=0.75$, $\beta=0.83$) for soft steel, ($A_0=116$, $\alpha=0.68$, $\beta=0.75$) for cast iron and ($A_0=79$, $\alpha=0.72$, $\beta=0.8$) for aluminum. The coefficient triplets ($A_0$, $\alpha$, $\beta$) for different milling cutter cum workpiece material combinations are determined empirically on the basis of a large number of machining operations.

A new coefficient $R_0$ for a new machining operation is determined during a trial run with a new milling cutter by a calibration unit 11 which acquires $M_{(j)}$ and $F_{z(j)}$ and is provided with a coefficient triplet ($A_0$, $\alpha$, $\beta$) for a particular milling cutter cum workpiece material combination as indicated by a machine operator.

Coupled to the ACS 5, the torque monitor 7 and the memory 10 is an instantaneous tool wear coefficient processor 13 for calculating instantaneous tool wear coefficients $r_{(j)}$ in accordance with the relationship $M_{(j)}=A_0F_{z(j)}^\alpha r_{(j)}^\beta$ where $F_{z(j)}$ is the instantaneous feed per tooth of the milling cutter 2 at different positions along its cutting path while cutting an ith successive workpiece. If the instantaneous feed per tooth $F_{z(j)}$ is unavailable directly, it can be readily calculated according to the relationship $F_{z(j)}=F'_{(j)}/(S'_{(j)}z)$ where $F'_{(j)}$ is an instantaneous feed rate of the milling cutter 2 relative to a workpiece, $S'_{(j)}$ is its instantaneous spindle speed and z is the number of its flutes.

Coupled to the processor 13 is an average tool wear coefficient processor 14 for calculating an average tool wear coefficient $R_{(i)}$ for the milling cutter 2 cutting an ith successive workpiece in accordance with the general relationship:

$$R_{(i)} = \frac{1}{n}\sum_{j=1}^{n} r_{(j)}$$

Coupled to the memory 10 and the processor 14 is a tool wear coefficient comparator 15 for comparing an average tool wear coefficient $R_{(i)}$ to a reference average tool wear coefficient $R_0$ to provide the tool status indication on the monitor 8 and to issue a tool change interniption signal TC, if appropriate.

Figure 3:
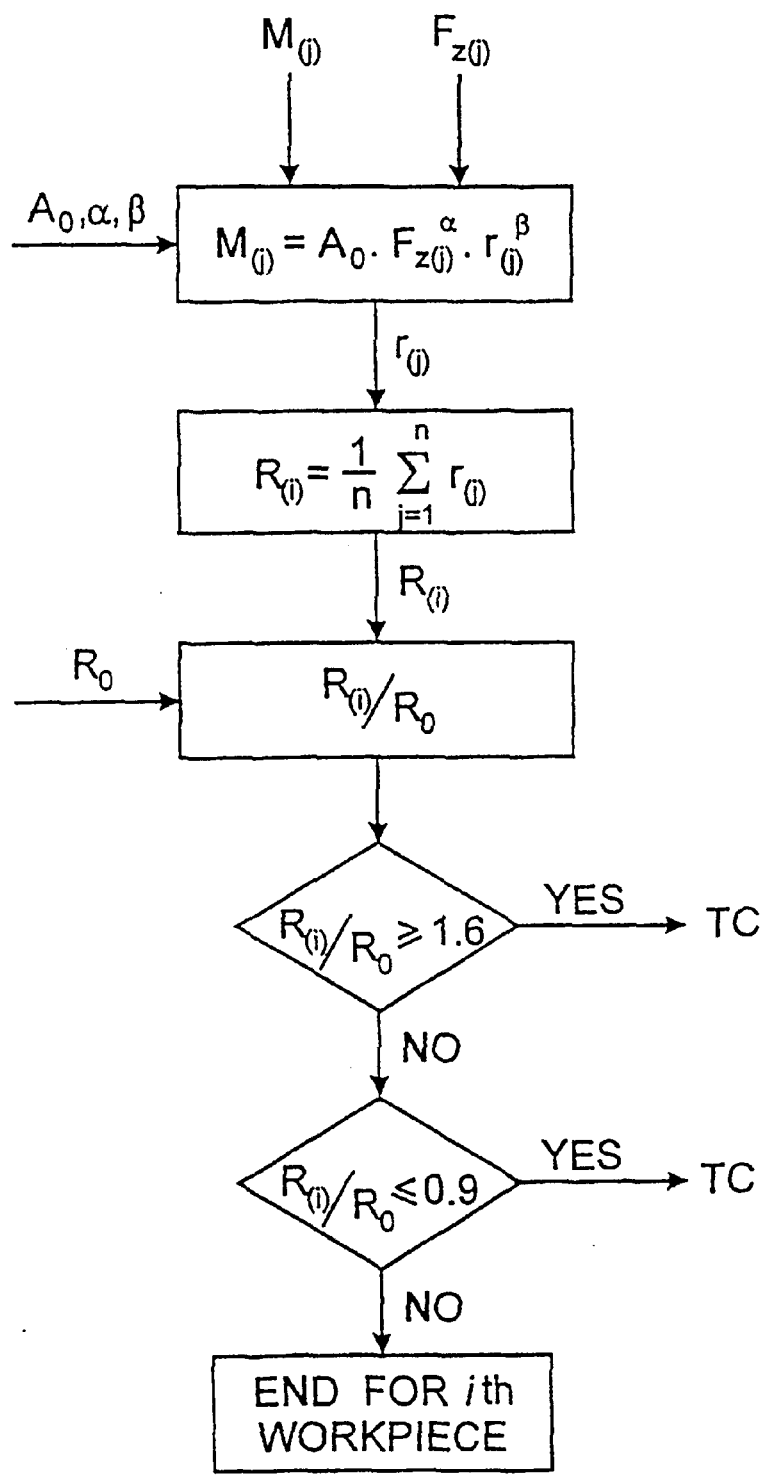
FIG. 3 is a flow diagram of the operation of the AMS of FIG. 1.

The operation of the AMS 1 is now described with reference to FIG. 3 which illustrates that after determining an unknown $R_0$ for a new milling cutter for a new machining operation, for each ith successive workpiece, the processor 13 calculates instantaneous tool wear coefficients $r_{(j)}$ typically at a sampling rate of 10 samples per sec. from which the processor 14 calculates a non-weighted average tool wear coefficient $R_{(i)}$ for the milling cutter which is then compared to the reference average tool wear coefficient $R_0$ by the comparator 15 to determine the ratio $R_{(i)}/R_0$ being indicative of the instantaneous tool status of the milling cutter.

As mentioned above, when the ratio $R_{(i)}/R_0$ lies in the operative range [0.9,1.6], the instantaneous tool status is shown as a tool wear percentage in accordance with the relationship:

$$\left[\frac{1.6 - R_{(i)}/R_0}{0.6}\right] \times 100\%$$

Figure 4:
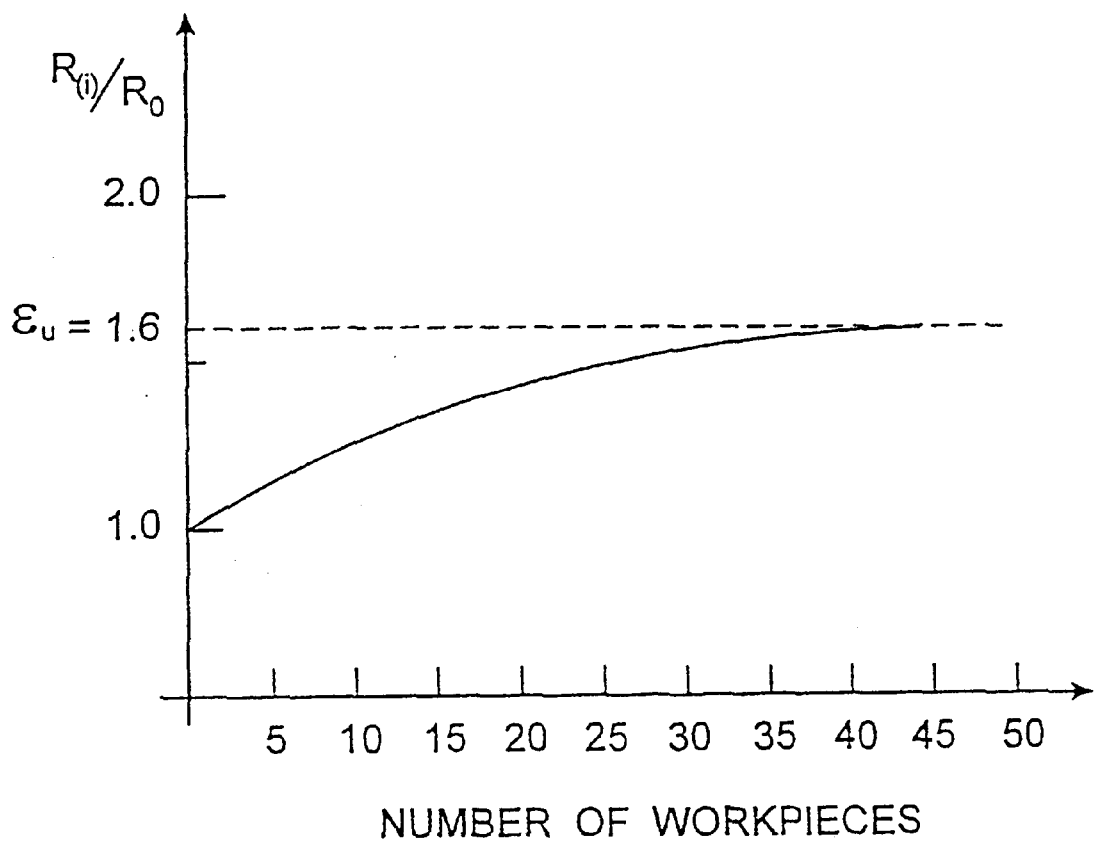
FIG. 4 is a graph showing a typical curve of the ratio $R_i/R_0$ against ith successive workpieces for a given machining operation.

As shown in FIG. 4, as a milling cutter wears, the ratio $R_{(i)}/R_0$ for each successive ith workpiece asymptotically increases towards the predetermined upper critical threshold 1.6 corresponding to when it is substantially dulled and requires replacement. In the example shown, the milling cutter is worn after about 45 workpieces.

In an automatic mode of operation of the AMS 1, when the ratio $R_{(i)}/R_0$ falls outside the operative range [0.9,1.6] when it is either broken or worn, the AMS 1 issues a tool change interruption signal TC to the CNC unit 4.

While the invention has been described with respect to a limited number of embodiments, it will be appreciated that many variations, modifications and other applications of the invention can be made by those ordinarily skilled in the art. For example, the automatic monitoring system can be installed as an original OEM feature or retrofitted to existing CNC machines.

What is claimed is:

1. A system for automatically monitoring tool status so as to provide an instantaneous tool status indication for a stock removal cutter cutting identical workpieces in accordance with a given machining operation for which a substantially new stock removal cutter of the same type has a reference average tool wear coefficient $R_0$, the system comprising:

(a) means for determining a main drive cutting torque M during the cutting of an ith successive workpiece;
   (b) an instantaneous tool wear coefficient processor for calculating a plurality of instantaneous tool wear coefficients $r_{(j)}$ for the stock removal cutter during the cutting of said ith workpiece;
   (c) an averace tool wear coefficient processor for calculating an average tool coefficient $R_{(i)}$ for the stock removal cutter from said plurality of instantaneous tool wear coefficients $r_{(j)}$; and
   (d) a tool wear coefficient comparator for comparing said average tool wear coefficient $R_{(i)}$ to the reference average tool wear coefficient $R_0$ to provide an instantaneous tool status indication for the stock removal cutter after cutting each ith successive workpiece; characterized in that said instantaneous tool wear coefficient processor calculates an instantaneous tool wear coefficient $r_{(j)}$ in accordance with the general relationship: $M_{(j)} = A_0 F_{(j)}^{\alpha} r_{(j)}^{\beta}$ wherein F is the instantaneous feed rate of the relative movement between the stock removal cutter and a workpiece and $A_0$, $\alpha$ and $\beta$ are coefficients dependent on the stock removal cutter cum workpiece material combination.

2. The system according to claim 1, wherein said instantaneous tool wear coefficient processor calculates an instantaneous tool wear coefficient $r_{(j)}$ in accordance with the general relationship: $M_{(j)} = A_0 F_{Z(j)}^{\alpha} r_{(j)}^{\beta}$ for when the stock removal cutter is a milling cutter and $F_z$ is the feed per tooth of the milling cutter.

3. A method for automatically monitoring tool status so as to provide an instantaneous tool status indication for a stock removal cutter cutting identical workpieces in accordance with a given machining operation for which a substantially new stock removal cutter of the same type has a reference average tool wear coefficient $R_0$. the method comprisina the steps of:

(a) determining a main drive cutting torque M during the cutting of an ith successive workpiece;
   (b) calculating a plurality of instantaneous tool wear coefficients $r_{(j)}$ for the stock removal cutter during the cutting of the ith successive workpiece.
   (c) calculating an average tool wear coefficient $R_{(i)}$ for the stock removal cutter from said plurality of instantaneous tool wear coefficients $r_{(j)}$; and
   (d) comparing said average tool wear coefficient $R_{(i)}$ to the reference average tool wear coefficient $R_0$ to provide an instantaneous tool status indication for the stock removal cutter after cutting each ith successive workpiece; characterized in that step (b) includes calculating an instantaneous tool wear coefficient $r_{(j)}$ in accordance with the general relationship: $M_{(j)} = A_0 F_{(j)}^{\alpha} r_{(j)}^{\beta}$ wherein F is the instantaneous feed rate of the relative movement between the stock removal cutter and a workpiece and $A_0$, $\alpha$ and $\beta$ are coefficients dependent on the stock removal cutter cum workpiece material combination.

4. The method according to claim 3, wherein step (b) includes calculating an instantaneous tool wear coefficient $r_{(j)}$ in accordance with the general relationship: $M_{(j)} = A_0 F_z^{\alpha} r_{(j)}^{\beta}$ for when the stock removal cutter is a milling cutter and $F_z$ is the feed per tooth of the milling cutter.

\* \* \* \* \*